United States Patent
Liu

(10) Patent No.: US 8,254,105 B2
(45) Date of Patent: Aug. 28, 2012

(54) ELECTRONIC DEVICE WITH A COVERED EXPANSION CARD BAY

(75) Inventor: Zhi-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 333 days.

(21) Appl. No.: 12/615,281

(22) Filed: Nov. 10, 2009

(65) Prior Publication Data
US 2011/0075379 A1 Mar. 31, 2011

(30) Foreign Application Priority Data
Sep. 29, 2009 (CN) .......................... 2009 1 0307974

(51) Int. Cl.
*G06F 1/16* (2006.01)
*H05K 7/00* (2006.01)
*H05K 9/00* (2006.01)

(52) U.S. Cl. ......... 361/679.32; 361/679.31; 361/379.35; 361/728; 361/816; 361/818; 361/679.37

(58) Field of Classification Search .................. 361/686, 361/727, 731, 756, 816, 818, 679.32, 807, 361/810, 679.31, 679.35, 679.37, 728; 439/136, 439/138; 312/223.2
See application file for complete search history.

(56) References Cited

U.S. PATENT DOCUMENTS

| | | | | |
|---|---|---|---|---|
| 4,975,805 A * | 12/1990 | Schmutzler | ................... | 361/754 |
| 5,337,220 A * | 8/1994 | Granitz | ........................ | 361/816 |
| 5,559,672 A * | 9/1996 | Buras et al. | .............. | 361/679.32 |
| 5,673,175 A * | 9/1997 | Carney et al. | ............ | 361/679.58 |
| 5,694,290 A * | 12/1997 | Chang | ...................... | 361/679.31 |
| 5,959,834 A * | 9/1999 | Chang | ...................... | 361/679.31 |
| 6,040,979 A * | 3/2000 | Homer | ..................... | 361/679.37 |
| 6,269,005 B1 * | 7/2001 | Tung et al. | ..................... | 361/737 |
| 6,411,583 B1 * | 6/2002 | Yamamoto et al. | ........... | 720/647 |
| 6,416,031 B1 * | 7/2002 | Billman | ........................ | 248/694 |
| 6,558,175 B1 * | 5/2003 | Yu | .................. | 439/138 |
| 6,628,518 B2 * | 9/2003 | Behl et al. | ................ | 361/679.47 |
| 6,639,792 B1 * | 10/2003 | Chang | ........................ | 361/679.4 |
| 6,831,698 B2 * | 12/2004 | Fuchimukai | .................. | 348/373 |
| 7,104,817 B2 * | 9/2006 | Shiue et al. | ................... | 439/137 |
| 7,135,644 B1 * | 11/2006 | Gilliland et al. | .............. | 174/383 |
| 2001/0049214 A1 * | 12/2001 | Billman | ........................ | 439/138 |
| 2007/0297159 A1 * | 12/2007 | Gilliland | ...................... | 361/818 |

* cited by examiner

*Primary Examiner* — Timothy Thompson
*Assistant Examiner* — Sherman Ng
(74) *Attorney, Agent, or Firm* — Altis Law Group, Inc.

(57) ABSTRACT

An electronic device includes a main body, an expansion card holder, and a protective cover assembly. The main body defines an opening. The expansion card holder is located in the main body adjacent to the opening. The expansion card holder defines a bay facing the opening to receive an expansion card. The protective cover assembly includes a rotary shaft unit, and a metallic cover rotatably connected to the main body via the rotary shaft unit. The metallic cover includes a cover portion covering the opening, and a resisting portion extending from the cover portion and resisting the main body. The resisting portion provides resilient force impelling the cover portion to cover the opening automatically.

12 Claims, 6 Drawing Sheets

ELECTRONIC DEVICE WITH A COVERED EXPANSION CARD BAY

BACKGROUND

1. Technical Field

The present disclosure generally relates to electronic devices and, particularly, to an electronic device with a covered expansion card bay.

2. Description of Related Art

Expansion cards are often utilized in electronic devices to increase storage space and/or install desired applications. Expansion cards include a PCMICA card (Personal Computer Memory International Association card), a PC card (Personal Computer card), express card, or other.

A commonly used electronic device includes a main body, an expansion card holder, and a protective cover assembly for the expansion card holder. The main body defines an opening adjacent to which the expansion card holder is located and can be exposed to an outer side via the opening. The protective cover assembly includes a cover, a rotary shaft, a shaft hole and a torsion spring. The shaft hole is defined in an inner side of the main body adjacent to the opening. The rotary shaft is fixed to the cover and received in the shaft hole, and the torsion spring is sleeved on the rotary shaft. The cover is rotatably fixed to the main body via the rotary shaft to cover the opening. The torsion spring provides a restoring resilient force when the cover is open. However, this structure of the protective cover assembly is unduly complicated and therefore costly to manufacture. In addition, the electronic device does not provide EMI (electro magnetic interference) shielding.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
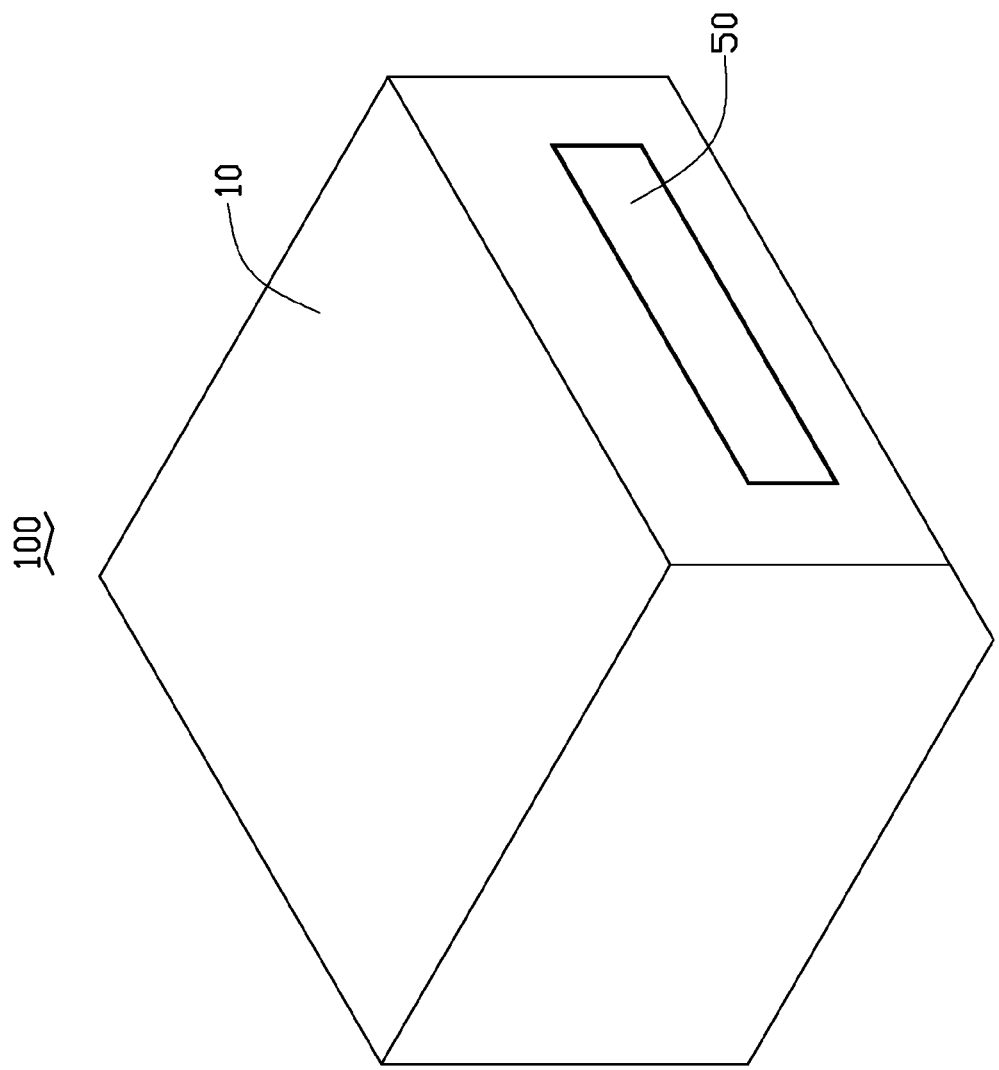
FIG. 1 is an isometric view of a first embodiment of an electronic device.
Figure 2:
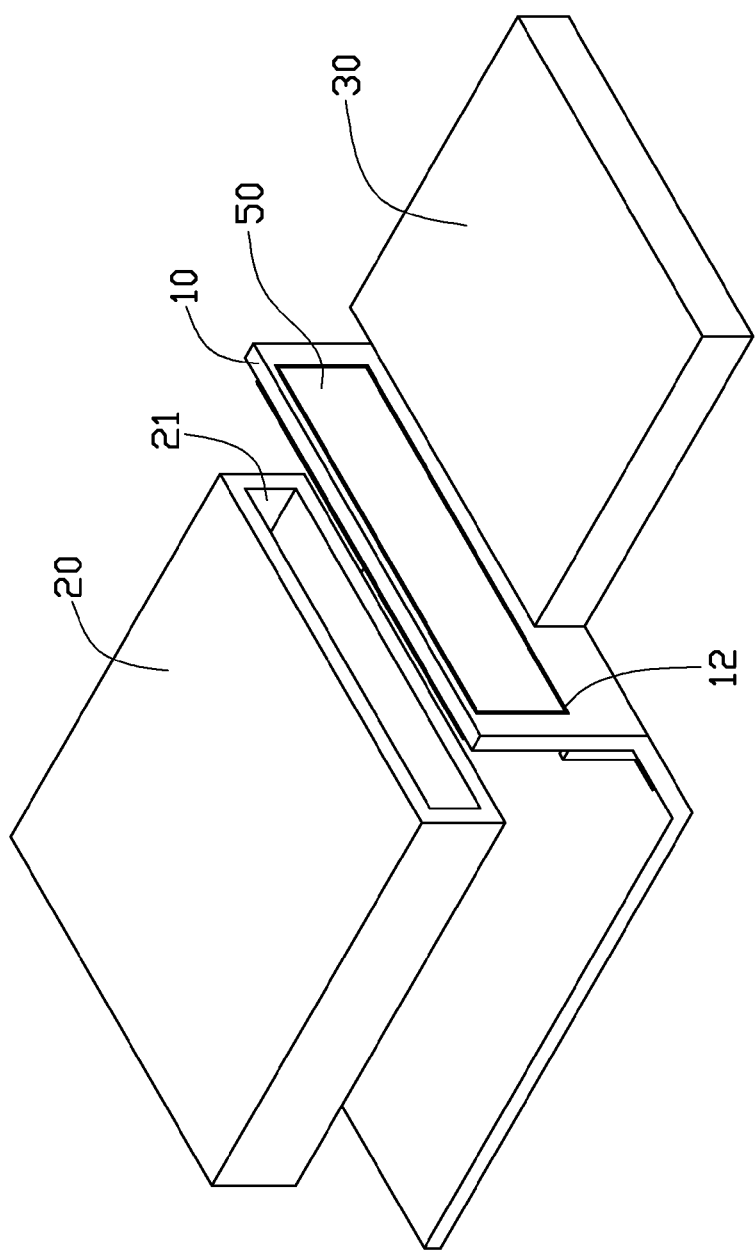
FIG. 2 is a partial assembled isometric view of the electronic device of FIG. 1 with an expansion card, the electronic device including a protective cover assembly including a metallic cover.

Referring to FIGS. 1 and 2, a first embodiment of an electronic device 100 includes a main body 10, an expansion card holder 20, and a protective cover assembly 50. The main body 10 defines an opening 12. The expansion card holder 20 is located in the main body 10 adjacent to the opening 12. The expansion card holder 20 defines a bay 21 facing the opening 12 to receive an expansion card 30. The protective cover assembly 50 is configured to cover the opening 12 and protect the bay 21 of the expansion card holder 20. The electronic device 100 can be a mobile phone, personal digital assistant (PDA), digital versatile disc (DVD), computer, and so on. The electronic device 100 includes various modules to perform corresponding function and features, however for simplicity, in the following embodiment only the protective cover assembly 50 for the expansion card holder 20 is described. In the illustrated embodiment, the electronic device 100 is a computer host.

Figure 3:
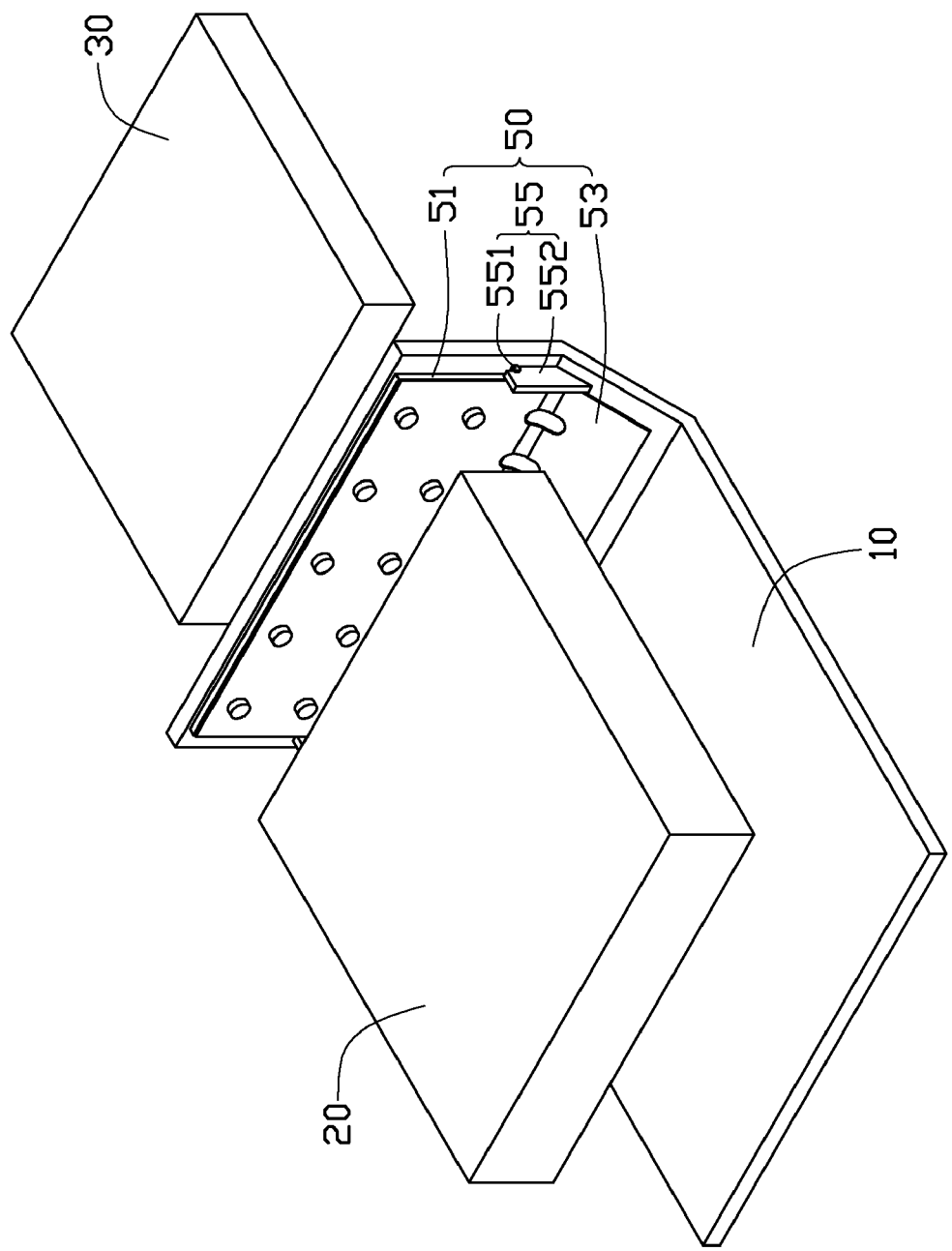
FIG. 3 is similar to FIG. 2, but viewed from another aspect.
Figure 4:
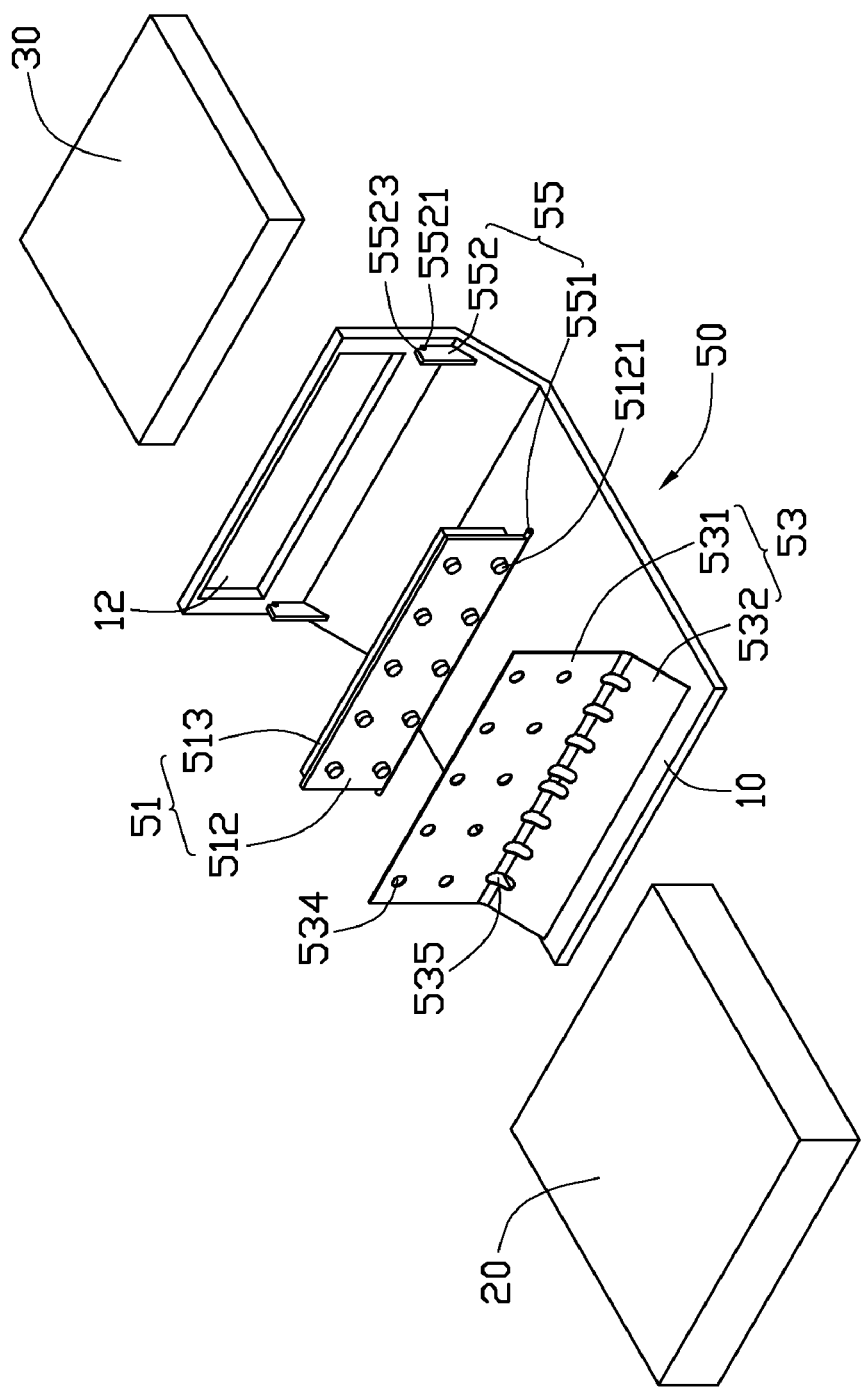
FIG. 4 is an exploded, partial isometric view of the electronic device of FIG. 3 showing an expansion card.

Referring to FIGS. 3 and 4, the protective cover assembly 50 includes an assisted cover 51, a metallic cover 53, and a rotary shaft unit 55. The metallic cover 53 is rotatably connected to the main body 10 via the assisted cover 51 and the rotary shaft unit 55. The metallic cover 53 includes a cover portion 531 and a resisting portion 532 extending from the cover portion 531. The assisted cover 51 includes a connecting portion 512, and a protruding portion 513 connected to a side of the connecting portion 512. The connecting portion 512 further includes a plurality of positioning protrusions 5121 formed at the other side of the connecting portion 512 away from the protruding portion 513. The cover portion 531 of the metallic cover 53 defines a plurality of positioning holes 534 corresponding to the positioning protrusions 5121. The positioning portions 5121 are received in the corresponding positioning holes 53, and the connecting portion 512 is fixed to the cover portion 531. The protruding portion 513 of the assisted cover 51 is configured to seal the opening 12 of the main body 10 completely. The electronic device 100 provides EMI shielding due to the metallic cover 53.

The rotary shaft unit 55 includes a pair of rotary shafts 551 and a pair of shaft bases 552. In the illustrated embodiment, the pair of rotary shafts 551 is correspondingly fixed to two corners of the connecting portion 512. The pair of shaft bases 552 is respectively fixed to an inner side of the main body 10 at two ends of the opening 12. Each shaft base 552 defines a shaft hole 5521 adjacent to a top thereof to receive a corresponding rotary shaft 551. Each shaft base 552 further defines a cutout 5523 at the top thereof communicating with the shaft hole 5521. Each rotary shaft 551 can be received in the shaft hole 5521 via the cutout 5523. The assisted cover 51 and the cover portion 531 of the metallic cover 53 are rotatably fixed to the main body 10 via the rotary shaft unit 55, and at the same time, the resisting portion 532 resists the main body 10. The resisting portion 532, returning by resilient force, impels the cover portion 531 to cover the opening 12 automatically.

In the illustrated embodiment, the metallic cover 53 further defines a plurality of through holes 535 where the cover portion 531 meets the resisting portion 532, increasing resilient force.

Referring to FIGS. 2 through 4 again, during assembly of the protective cover assembly to the main body 10, the positioning portions 5121 are first received in the corresponding positioning holes 53, and then the connecting portion 512 is fixed to the cover portion 531. Finally, the rotary shafts 551 are received in the shaft holes 5521, such that the assisted cover 51 and the metallic cover 53 are rotatably fixed to the main body 10 and the resisting portion 532 resists the main body 10.

Figure 5:
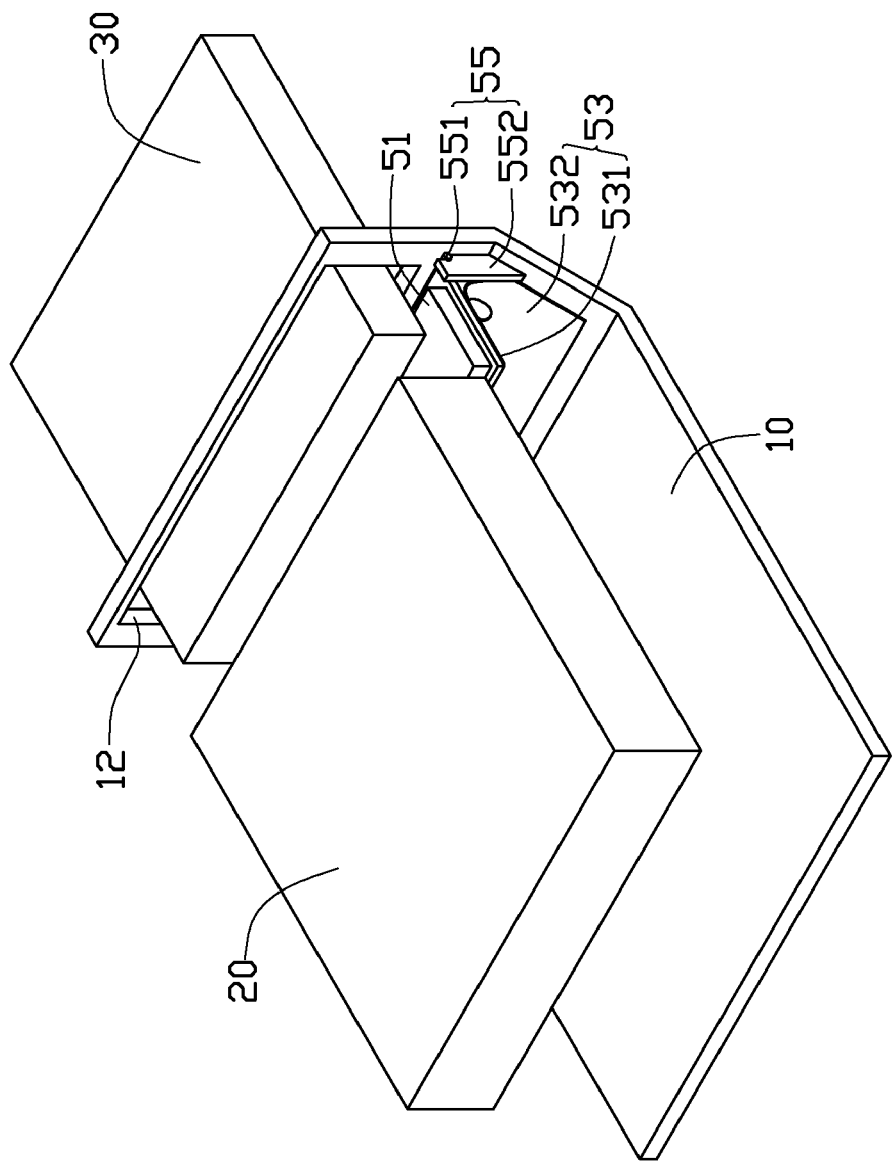
FIG. 5 is an assembled, partial isometric view of the electronic device of FIG. 4 with the expansion card received in the expansion card holder.
Figure 6:
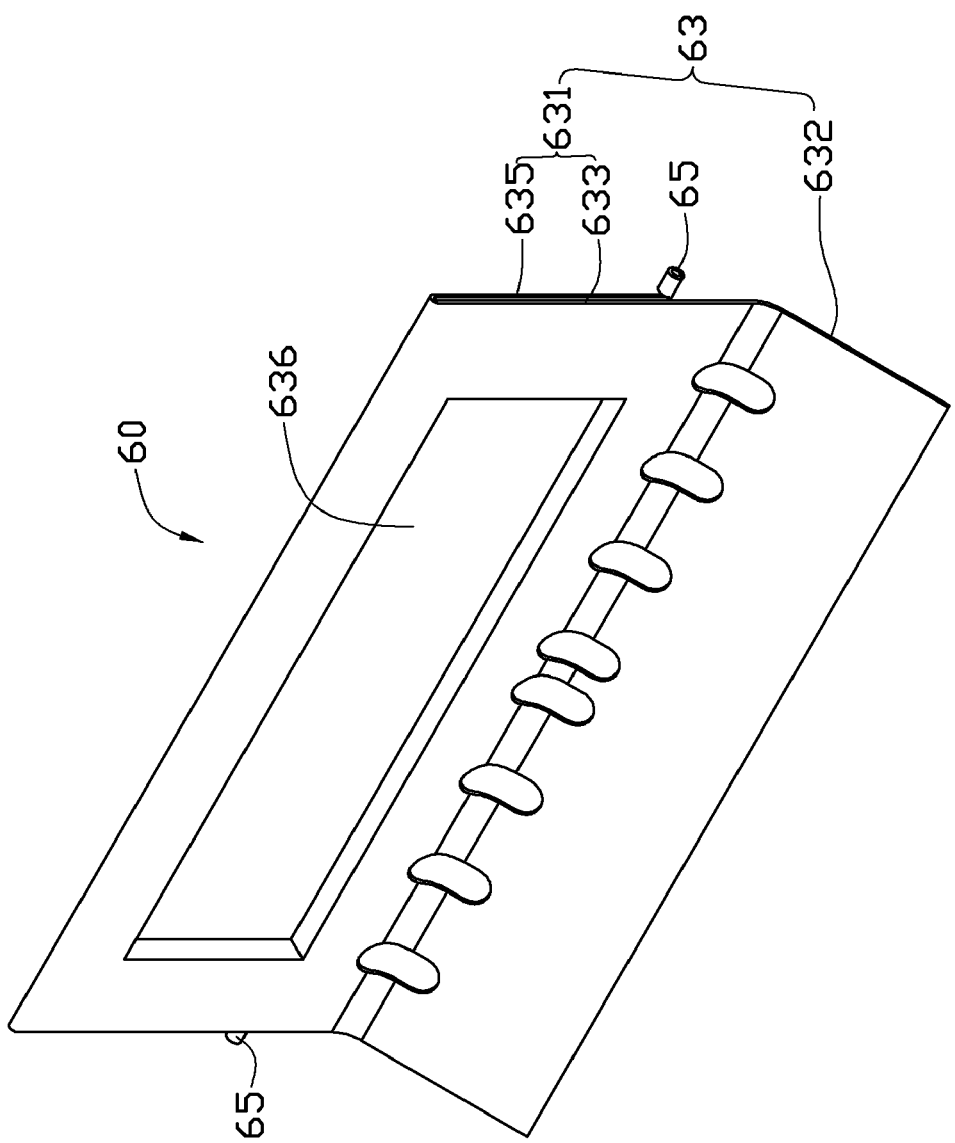
FIG. 6 is an isometric view of a metallic cover of a second embodiment of an electronic device.

Referring to FIGS. 2 and 5, during insertion of the expansion card 30 into the main body 10, the expansion card 30 is first situated facing the opening 12, and impelled toward the assisted cover 51. The assisted cover 51 and the cover portion 531 of the metallic cover 53 then rotate inward into the main body 10. At the same time, the resisting portion 532 resists an inner side of the main body 10, providing resilient force to the cover portion 531. The expansion card 30 is continuously impelled until received in the bay 21 of the expansion card holder 20. The cover portion 531 and the assisted cover 51 rotate backward by way of resilient force of the resisting portion 532 to seal the opening 12.

Removal of the expansion card 30 from the expansion card holder 20 begins by first impelling the assisted cover 51 toward an inner side of the main body 10. The assisted cover 51 and the cover portion 531 of the metallic cover 53 rotate inward into the main body 10 and expose the expansion card 30, which, when impelled toward an inner side of the expansion card holder 20, is at least partially ejected from the opening 12, and can then be fully withdrawn from the main body 10.

Referring to FIG. 5, in a second embodiment, a protective cover assembly 60 includes a metallic cover 63 and a pair of rotary shafts 65. In this embodiment, an assisted cover, such as the assisted cover 51 of the first embodiment, is omitted. The metallic cover 63 includes a cover portion 631 and a resisting portion 632. The metallic cover 63 is similar to the metallic cover 53 in principle, differing in that the cover portion 631 includes a first sheet 633 and a second sheet 635. The second sheet 635 extends from an edge of the first sheet 633 and bends around the first sheet 633 until the second sheet 635 is substantially parallel to the first sheet 633. The cover portion 631 includes a protruding protrusion 636 formed by punching the first sheet 633 to seal the opening 12. The rotary shafts 65 are formed at an end of the second sheet 635.

It is to be understood that, in alternative embodiments, the rotary shafts 65 can be formed at opposite side edges of the first sheet 635, or formed where the first and second sheets 633, 635 meet.

It should be noted that, in an alternative embodiment, the rotary shafts 551 can be fixed to the main body 10 adjacent to the opening 12, and the shaft holes 5521 can be defined in the metallic cover 53 or the assisted cover 51. Thus, the shaft base 552 can be omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising: a main body defining an opening; an expansion card holder located in the main body adjacent to the opening, the expansion card holder defining a bay facing the opening to receive an expansion card; and a protective cover assembly comprising a rotary shaft unit and a metallic cover rotatably connected to the main body via the rotary shaft unit, wherein the metallic cover comprises a cover portion covering the opening, and a resisting portion extending from the cover portion and resisting the main body, wherein resilient force from the resisting portion impels the cover portion to cover the opening automatically; and wherein the cover portion and the resisting portion are integrally formed.

2. The electronic device of claim 1, wherein the protective cover assembly further comprises an assisted cover fixed to the cover portion of the metallic cover.

3. The electronic device of claim 2, wherein the assisted cover comprises a connecting portion and a protruding portion connected to a first side of the connecting portion, thereby sealing the opening of the main body.

4. The electronic device of claim 3, wherein the connecting portion further comprises a plurality of positioning protrusions formed at a second side of the connecting portion away from the protruding portion; the cover portion of the metallic cover defines a plurality of positioning holes corresponding to the positioning protrusions; the positioning portions are received in the corresponding positioning holes, to fix the connecting portion to the cover portion.

5. The electronic device of claim 3, wherein the rotary shaft unit comprises a pair of rotary shafts fixed to two corners of the connecting portion and a pair of shaft bases fixed to an inner side of the main body at two ends of the opening respectively; each shaft base defines a shaft hole adjacent to a top of each shaft base to receive the corresponding rotary shaft.

6. The electronic device of claim 3, wherein each shaft base further defines a cutout at a top of each shaft base communicating with the shaft hole.

7. The electronic device of claim 1, wherein the metallic cover further defines a plurality of through holes where the cover portion meets the resisting portion of the metallic cover.

8. The electronic device of claim 1, wherein the cover portion comprises a first sheet and a second sheet extending from an edge of the first sheet, the second sheet bending around the first sheet until the second sheet is substantially parallel to the first sheet.

9. The electronic device of claim 8, wherein the cover portion further comprises a protruding protrusion extending from the first sheet to seal the opening.

10. The electronic device of claim 8, wherein the rotary shaft unit comprises a pair of shafts formed at two ends of the second sheet.

11. The electronic device of claim 8, wherein the rotary shaft unit comprises a pair of shafts formed at opposite side edges of the first sheet, or where the first and second sheets meet.

12. The electronic device of claim 1, wherein the rotary shaft unit comprises a pair of rotary shafts fixed to the main body adjacent to the opening, and a pair of shaft holes defined in the metallic cover.

* * * * *